Nov. 24, 1953 — T. A. WOOLSEY — 2,659,954
COUPLING CLAMP WITH CONSTANT SPRING LOADING
Filed Oct. 16, 1951 — 2 Sheets-Sheet 1
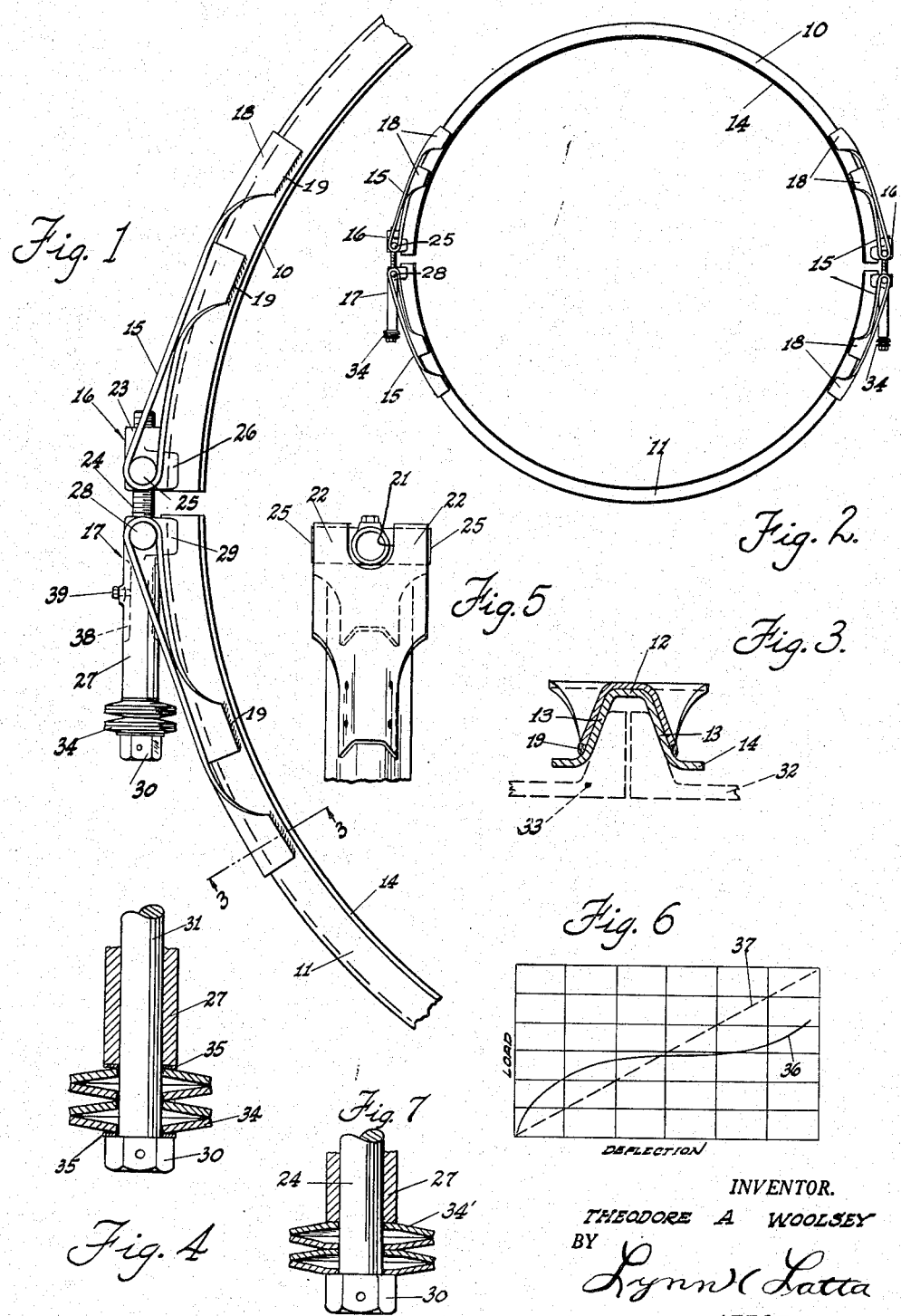
INVENTOR.
THEODORE A WOOLSEY
BY Lynn C Latta
ATTORNEY Nov. 24, 1953  T. A. WOOLSEY  2,659,954
COUPLING CLAMP WITH CONSTANT SPRING LOADING
Filed Oct. 16, 1951  2 Sheets-Sheet 2

INVENTOR.
THEODORE A. WOOLSEY
BY Lynn Latta
ATTORNEY.

Patented Nov. 24, 1953

2,659,954

UNITED STATES PATENT OFFICE 2,659,954

COUPLING CLAMP WITH CONSTANT SPRING LOADING

Theodore A. Woolsey, Inglewood, Calif.

Application October 16, 1951, Serial No. 251,473

6 Claims. (Cl. 24—279)

This application is in part a continuation of my pending application Serial No. 95,765, filed May 27, 1949, now abandoned.

This invention relates to couplings and band clamps and has as its object to provide a flexible band type of coupling device including spring loaded connector means for joining adjacent ends of the coupling band together with a take-up action for tightening the band about a cylindrical or tubular object upon which it is installed.

A particular object of the invention is to provide a tube coupling or band clamp having spring loaded connector means adapted to yield in order to accommodate normal expansion and contraction of the clamped object.

The use of radially constricting band clamps and coupling devices for joining tube sections together is quite common. However, prior devices of this kind have been extremely subject to failure in installation subject to a wide range of thermal expansion, such as in the joining of the sections of exhaust tube of jet engines in aircraft. The failure of such coupling devices in installations of this kind has in most instances been caused by the increase in tension in the clamp or coupling, arising from thermal expansion in the tube sections. As the tube sections during flight of the aircraft attain temperatures relatively higher than the temperatures of the clamp itself, the tube sections consequently expand at a faster rate and to a greater extent than do the relatively cooler elements of the coupling. As the coupling band is not free to expand, the expansion in the tube sections produces relatively high stresses in the already stressed coupling, with consequent failure in the coupling and the joint.

In the attempt to provide some means for accommodating yielding in a coupling band, it has been proposed to insert compressed coil springs within the band. However, such coil springs have a high positive load deflection rate, their loading increasing with compression, and it has been found that their characteristic high rate makes them unsuitable for use in installations subject to a wide range of expansion. Furthermore, such coil springs materially increase the weight of the coupling and render it undesirable for aircraft use where weight saving is of extreme importance.

With the foregoing in mind, a principal object of the present invention is to provide a tube coupling incorporating, in the means for joining the ends of a coupling band, a substantially zero rate spring loading means for imposing and maintaining a substantially unvarying hoop tension in the coupling band and for yielding to accommodate expansion, without increasing the tension. A further object is to provide a coupling having resilient means adapted to maintain a substantially constant spring loading throughout a relatively wide deflection range.

Specifically, the invention contemplates the use of a plurality of frusto-conical spring washers of the Belleville type, interposed under compression between members of a band clamp or coupling.

A particular object is to utilize Belleville washer spring loading means in a band coupling, without materially increasing the complexity of the coupling assembly. A further object is to utilize Belleville washer spring loading means in a band coupling without materially changing the dimensions or proportions of the coupling.

The foregoing objects attained by incorporating a plurality of relatively small diameter Belleville washers within the connector assembly of a band coupling, said connector assembly embodying a tension bolt extending through the Belleville washers, with the washers stacked thereon in series between an abutment (such as a head or nut) at one end of the bolt and the tubular guide of a T-trunnion which is interposed as a compression element between the washers and one end of the coupling band, and with the other end of the bolt having abutment means (or another T-trunnion) for connecting the same to the other end of the band.

The invention is particularly adapted to a "V-band" type of coupling for connecting abutting flanges on the ends of tube sections with a wedging action for drawing the flanges axially into sealing contact with each other or with an interposed gasket.

In such a V-band coupling, the invention deals with the problem of resisting the tendency of the opposed, diverging side walls of the V-band from springing apart under the compressive forces exerted thereagainst by the tube flanges being drawn together. I have found that this problem exists particularly at the ends of the band where they are joined by the take-up connector means. In the body of the band, each small increment of length of the band has its respective circumferential extremities integrally joined to an adjacent increment of the band and thereby secured against axial deformation of the flanged edges of the band from planes normal to the major axis of the coupling. However, the free ends of the band where they are joined by the connector means, are not braced by such hoop tension, and are therefore particularly subject to spreading apart under the operative forces of wedging action. Accordingly, a further object of the invention is to provide a V-band type coupling having connector means embodying means for bracing the free end portions of the band against axial spreading under the wedging action of the coupling against adjoining tube flanges.

Other objects will become apparent in the ensuing specifications and appended drawings in which:

Fig. 1 is a side view of a portion of a "V-band" coupling embodying the invention;

Fig. 2 is a side view of the entire coupling band;

Fig. 3 is a transverse detail sectional view taken on the line 3—3 of Fig. 1 and illustrating the improved V-band bracing means of the invention;

Fig. 4 is a detail of the spring loading means of Fig. 1, showing an axial sectional view through the Belleville washers and an adjacent portion of a T-trunnion;

Fig. 5 is a fragmentary view of a portion of the connector means;

Fig. 6 is a graph contrasting the load deflection curve of the loading means of my invention with that of a conventional coil spring loading means;

Fig. 7 is a detail sectional view of a portion of a connector embodying a modified form of spring loading means;

Figure 8:
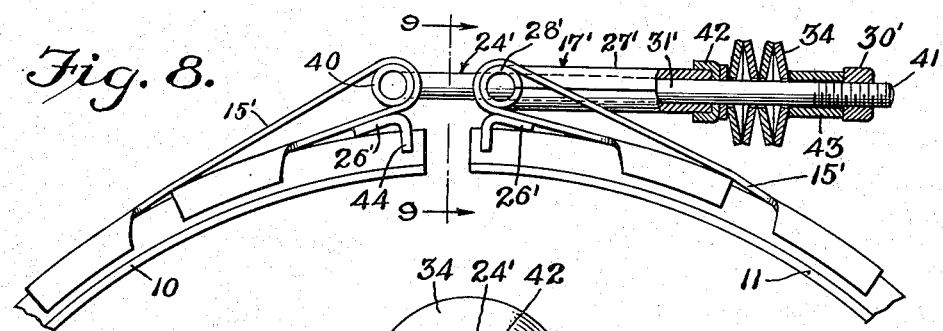
Fig. 8 is a side view of a portion of a coupling embodying a modified form of the invention.

As an example of one form in which the invention may be embodied, I have shown in Figs. 1 to 5 inclusive a V-band type coupling comprising a generally annular band in two substantially identical semi-circular sections 10 and 11, each of V-channel section, with diverging side wall members 13 joined by a web portion 12. Side wall portions 13 subtend an included angle which may be approximately 40°.

In this embodiment of the invention, each band section is securely joined, as by spot welding, to a saddle 15 having a loop 22 adapted to provide a bearing for a respective trunnion 16, 17. Each saddle 15 is formed from a length of strap metal bent back on itself to define the trunnion receiving loop portion 22 thereof and leg portions of unequal length. The saddles are of greater axial width than the band sections 10, 11, and the free ends of their leg portions are bent to form reinforcing yokes 18 the inner walls of which conform to the outer walls of the end portions of band sections 10, 11 and are united thereto as by welds 19. Thus the saddles serve the double function of providing bearings for the T-heads of the connector elements presently to be described, and reinforcing the free ends of the band sections against axial spreading. Since the two ends of the saddles are circumferentially spaced, and are attached at circumferentially spaced points to the band sections, the latter are reinforced to an appreciable portion of their circumferential extent.

The loop portion of each saddle member is centrally apertured or cut out as at 21 (Fig. 5), to provide clearance for the tubular stem portions 23, 27 of trunnions 16 and 17, and so as to provide the laterally spaced bearing loops 22 in which the T-heads 25, 28 of the respective trunnions bear for pivotal movement. The particular trunnions 16, 17 are of forged construction, including the tubular stem portions 23 and 27 respectively, and having the T-heads 25, 28 in the form of integral bosses projecting laterally from one end thereof in opposed relation. The trunnions also are provided with bracing yokes 26, 29, formed integrally therewith and extending at right angles to the axes of T-heads 25, 28, into bracing engagement with the extreme end portions of the band sections 10, 11. Yokes 26, 29 supplement the action of bracing yokes 18 in preventing spreading of the free end portions of the band sections.

The trunnions 16, 17 are assembled as shown in Fig. 2 with their T-heads 25, 28 journalled in the saddle bearing loops 22 and with their tubular stems 23, 27 in axial alignment to receive a clamping bolt 24. Clamping bolt 24 has a head 30 and a shank 31. Bolt 24 extends through the stem 27 and shank 31 has a threaded end portion which is threaded into the stem 23. Stem 23 is internally threaded to function as a nut for the bolt 24.

As an illustration of one use of the clamp, Fig. 3 shows, in broken lines, a pair of pipe sections 32 having at their abutting ends, radially outwardly extending flanges 33 the remote faces of which are frusto-conical to match the divergence of side walls 13 of the band sections. It will be apparent that as bolts 24 are tightened to draw the band sections 10 and 11 together, engagement of side wall portions 13 of the band sections with the inclined walls of flanges 33 will apply radially compressive forces which will be transformed into axial forces drawing the flanges 33 together into compressive engagement to seal the joints between the pipe sections. If desired, gasket means may be interposed between the flanges 33 to insure a better seal.

The coupling device of the present invention is particularly useful in joining sections of a jet engine exhaust pipe. It will be apparent that the exhaust gases will heat the pipe sections 32 and their flanges 33 to relatively high temperatures during operation of the aircraft. Although the encircling coupling sections 10, 11 will be also heated by conduction, the temperature attained by them will be lower than that of the tube sections 32, because of their exposed positions. Accordingly, tube sections 32 and their flanges 33 will expand at a faster rate and to a greater extent than the band sections 10 and 11. Since relatively high tension loads must be established in the coupling in order to provide the desired connection between the tube sections 32, the disproportionate expansion of the parts would, if the band sections were relatively unyielding, readily result in failure of the coupling.

To meet this problem, my invention provides a means for loading the coupling with a hoop tension of substantially constant load value throughout a considerable range of variation in circumference. A series of Belleville spring washers are utilized in order to provide a spring loading of substantially zero deflection rate (constant loading under deflection). The objects of the invention are attained by utilizing a number of relatively small diameter washers encircling the clamp bolt 24 adjacent one extermity thereof. The diameter of the washers may be no greater than the axial width of the band sections 10, 11.

The washers are sufficiently small to add very little to the overall weight of the coupling. However, in spite of such small dimensions, a series of such washers will provide the desired result of spring loading the coupling for circumferential yielding while maintaining substantially a constant hoop tension.

Washers 34 are interposed under compression between an abutment on bolt member 24 and one of the trunnion members 16, 17. In the particular arrangement shown in Figs. 1–5, they are interposed between the head 30 of the bolt 24 and the outer end of stem 27, opposite T-head 28. They are arranged in pairs, alternately facing in opposite directions, with the peripheries of paired washers in engagement with each other and with the inner extremities of adjacent washers between pairs, engaging each other. The inner extremities of the remote washers engage respectively the head 30 and the stem 27. Thus the washers are stacked in series, their respective deflections being added to provide the total deflection of the assembly. However, since their deflection rate is substantially zero (i. e. since their spring loading is substantially constant irrespective of deflection) the washers will provide a substantially constant spring load which is independent of the number of washers utilized. Thus the total amount of circumferential expansion which is accommodated by the coupling may be adjusted by the very simple expedient of inserting or removing pairs of washers into or from the assembly.

To prevent the inner edges of the washers from scoring the under surface of head 30 and the end face of stem 27, substantially flat washers 35 of a material at least as hard as that of the washers 34, are interposed between the outer washers and the head 30 and stem 27 respectively. However, where washers 34' of concavo-convex form, as shown in Fig. 7, are utilized, the bearing washers 35 may be dispensed with.

The spring washers of the present invention have a load deflection curve such as that indicated at 36 in Fig. 6. The central, substantially horizontal portion of this curve illustrates the useful portion of the deflection curve which has a substantially zero rate (constant loading). The broken line 37 illustrates the high positive rate (constantly increasing loading) of a coil spring as it is compressed, resulting in a different loading for every stage of deflection, i. e. for every change in circumferential dimension in a coupling equipped with coil springs.

As the washers 34 will be subjected to temperatures substantially above normal, the material from which the washers are formed should be such that the resiliency thereof will not be adversely effected by the relatively high temperatures which eventually the washers may attain in the use of the device of the present invention. Excellent results have been obtained where the washers have been formed of stainless steel-tungsten alloys, for it has been found that such alloys retained their resiliency even after prolonged periods of heating at temperatures in excess of 500° F.

The spring washers 34 do not complicate the assembly of the clamp, for they are merely slipped over the end of the bolt prior to the insertion of the shank 31 thereof through the smooth bore of the trunnion 17. It is obvious that the washers will not complicate the use of the clamp as would a coil spring. Even the combined weight of a plurality of the washers shown is practically negligible, so that no weight penalty is imposed by their use.

If desired, the shank 31 of the bolt may be reduced as shown at 38 in broken lines in Figure 1. This permits an abutment screw 39 to be so threadedly mounted in a small tapped opening formed in the body member 27 that its inner end projects into the reduced portion 38 of the bolt to serve as an abutment to prevent inadvertent removal of the bolt from the trunnion 17. As the bolt 24 cannot become inadvertently separated from the trunnion 17, the washers 34 will remain assembled with the bolt and trunnion at all times.

Figure 9:
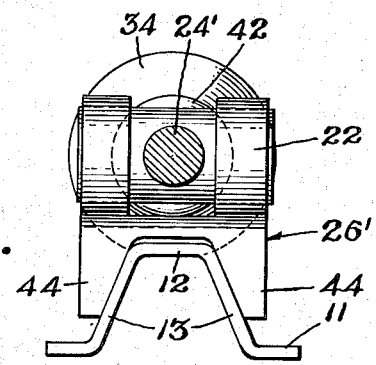
Fig. 9 is a transverse sectional detail taken on the line 9—9 of Fig. 8.

In the form of the invention shown in Figs. 8, 9, the T-trunnion 16 is dispensed with. Instead, the bolt 24' has a T-head 40 which is journalled in the bearing loop of a saddle 15', and the abutment at the other end of the bolt which applies compressive forces to the spring washer assembly, instead of being the head 30 of the other form of the invention, is a nut 30' threaded onto the threaded shank portion 41 of the bolt. T-trunnion 17', of stamped sheet metal construction has a T-head 28' journalled in bifurcated loop 22 of the other saddle 15', and an end cap 42 securing the split sections of stem 27' and providing the other abutment bearing for washers 34. The threaded shank portion 41 is of relatively short length, the bolt having a smooth shank portion 31' which extends through stem 27' of trunnion 17' and through washers 34, whereby the inner edges of washers 34 will not have any abrasive engagement with the threaded portion of the bolt. This smooth sliding engagement of washers 34 against the cylindrical surface of the unthreaded shank portion 31' of the bolt insures the operation of the washers so as to utilize to the fullest extent their constant loading characteristics. If the inner edges of the washers were allowed to bear against the threads of the bolts, they would tend to catch on the threads, and this would interfere with the uniform transmission of load between the bolt and the trunnion 17'.

A sleeve 43 is interposed under compression between washer springs 34 and nut 30'. The junction between the threaded shank portion 41 and unthreaded shank portion 31' of bolt 24' is disposed intermediate the ends of sleeve 43, whereby the threaded portion 41 may be of ample length to accommodate any desired adjustment of nut 30', while at the same time clearing washers 34 in all positions of adjustment. Adjustment of nut 30' serves to establish sufficient deflection of springs 34 when the parts are cold, to establish the spring loading within the "zero" rate portion of the spring deflection curve, preferably near the beginning thereof, allowing ample reserve deflection to accommodate the expansion of the parts under high temperature conditions. The extent of threaded portion 41 is adequate to establish the proper initial loading in various installations where there may be variance in circumferential dimension of the tube sections being coupled.

Saddles 15' are the same as the saddles 15 in the previously described form of the invention, with the exception that each is provided with a reinforcing yoke 26' of bent sheet metal in the general form of an angle bracket having one arm welded to a respective saddle member and another arm which is bifurcated to provide a pair of fingers 44 straddling the respective end portions of the band section as shown in Fig. 9.

This form of the invention has the advantageous features of the previously described form, i. e. the washers are of relatively small diameter and are strung upon the take-up bolt of the connector assembly of the coupling, under compression between one end of the bolt and a T-trunnion, connected to one end of the band, with the other end of the bolt connected to the other end of the band.

Figure 10:
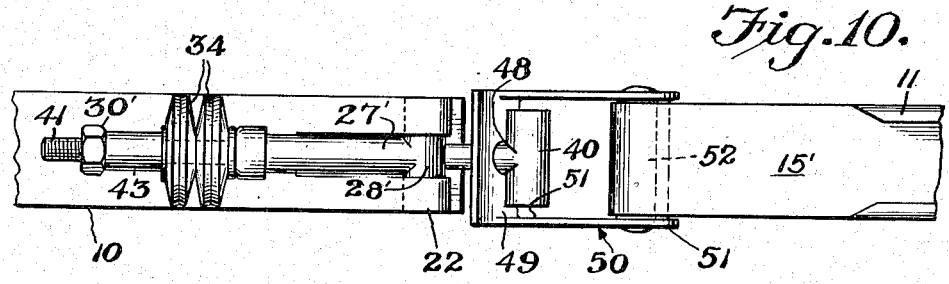
Fig. 10 is a plan view of a portion of a coupling embodying another modified form of the invention.
Figure 11:
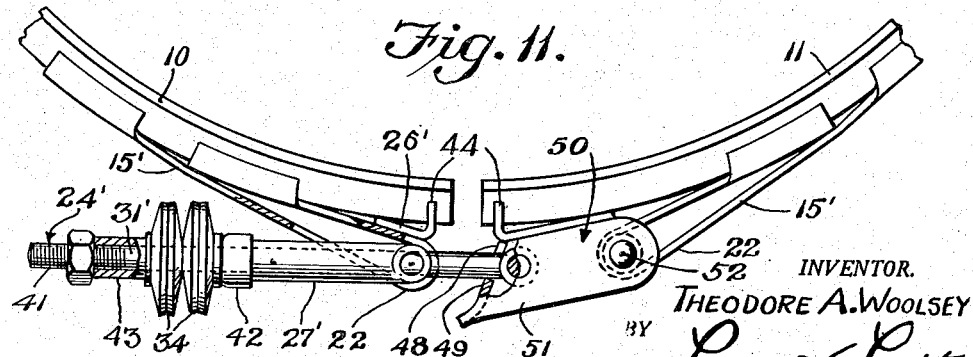
Fig. 11 is a side view of the same, with parts broken away and shown in section.

The form of the invention shown in Figs. 10, 11 embodies an arrangement similar to that shown in Figs. 8, 9, with the exception that a quickly separable latch 59 of yoke form, having side arms 51 joined by a pin 52 which is pivoted in a loop 15' of band 11, has a web portion 49 provided with an open slot 48 to receive bolt 24'. Other parts are the same as in Figs. 8, 9.

I claim:

1. A clamp coupling, comprising: a generally annular band having at least two end portions facing each other in circumferentially spaced relationship; a trunnion movably carried by each end portion; one of said trunnions having a bore therein at least partially threaded; the second trunnion having a smooth bore therein axially aligned with the bore of said first trunnion; a headed bolt passing through said bores, the free end of the bolt shank being threaded for engagement with said threaded bore for radially drawing said band inwardly about an article subject to thermal expansion; and a stack of Belleville washer springs having the characteristic of exerting a substantially constant load throughout a relatively wide range of deflection thereof circumscribing said bolt and disposed between the head thereof and said second trunnion, said springs being deflected as the bolt is threaded into said first trunnion to clamp said band about said article, said springs deflecting and permitting radially outward movement of said band to maintain a substantially constant tension stress in said band as the clamped article expands.

2. In a band coupling, an annular band having at least two circumferentially opposed separated end portions provided with bearing means; a trunnion having end portions journalled in one of said bearing means and having a central portion provided with an opening; a take-up bolt extending through said opening and having an unthreaded shank portion and a threaded portion; a nut threaded thereon; a plurality of Belleville washer springs encircling and supported on said unthreaded shank portion, said springs having a load deflection curve providing a substantially constant loading throughout a relatively wide range of deflection thereof; and means for connecting said bolt to the other of said bearing means, said last mentioned means, said nut, bolt, trunnion and washers and bearing means being arranged in series to connect said band end portions in tension, with said washers under compression and adapted, by flattening deflection to accommodate circumferential elongation of said band.

3. In a band coupling, an annular band having at least two circumferentially opposed end portions; a take-up bolt having abutment means at its respective ends, one of said abutment means comprising a head and the other comprising a nut; a T-trunnion including a head pivotally connected to one of said band end portions and a tubular stem through which said bolt extends; and a plurality of Belleville spring washers interposed in series under compression between said tubular stem and one of said abutment means, the other of said abutment means being pivotally connected to the other of said band end portions, said washers having a load deflection curve providing a substantially constant loading throughout a relatively wide range of deflection thereof.

4. A band coupling, an annular band having at least two circumferentially opposed end portions each provided with a bearing loop; a T-bolt having a head journalled in one of said bearing loops and having a smooth shank and a threaded end portion; a T-trunnion including a head journalled in the other of said bearing loops and a tubular stem through which said shank extends; a nut threaded on said threaded end portion of said bolt; a sleeve through which adjoining portions of said smooth shank and threaded portion of the bolt extend; and a series of Belleville washers stacked in series on said smooth shank, under compression between the end of said tubular stem and said sleeve, said sleeve being arranged between said washers and said nut, said washers having a load deflection curve providing a substantially constant loading throughout a relatively wide range of deflection thereof.

5. In a band coupling, an annular band having at least two circumferentially opposed end portions at least one of which comprises a bearing loop; a T-bolt having a cross-head; the other of said end portions having means for connecting it to said crosshead; a T-trunnion having a head journalled in said bearing loop and a tubular stem; said T-bolt having a smooth unthreaded shank extending through and beyond said stem and having a threaded end portion; a nut threaded on the latter; a sleeve through which adjoining portions of said shank and threaded portion of the bolt extend; and a stack of Belleville spring washers stacked in series on said smooth unthreaded portion of the T-bolt and under compression between the end of said stem and said sleeve, said sleeve being arranged between said washers and said nut, said washers having a load deflection curve providing a substantially constant loading throughout a relatively wide range of deflection thereof.

6. A coupling as defined in claim 5, wherein the means for connecting said other end of the band to the cross head comprises a loop on said other end and a latch of yoke shape having side arms, an integral web joining said arms at one end and provided with an open slot to receive said T-bolt shank; and a pin joining the other ends of said side arms and journalled in said loop on said other end of the band.

THEODORE A. WOOLSEY.

References Cited in the file of this patent

UNITED STATES PATENTS

| Number | Name | Date |
|---|---|---|
| 1,487,903 | Vitek | Mar. 25, 1924 |
| 2,325,193 | Nutt et al. | July 23, 1943 |
| 2,395,745 | King | Feb. 26, 1946 |
| 2,403,449 | Meyer et al. | July 9, 1946 |
| 2,522,494 | Baldo | Sept. 19, 1950 |

FOREIGN PATENTS

| Number | Country | Date |
|---|---|---|
| 370,408 | France | Dec. 19, 1906 |